Feb. 21, 1967 W. B. VELSINK 3,305,800
ELECTRICAL TRANSFORMER CIRCUIT
Filed Aug. 15, 1963 2 Sheets-Sheet 1

WILLEM B. VELSINK
INVENTOR.
BY
BUCKHORN, BLORE, KLARQUIST & SPARKMAN
ATTORNEYS

WILLEM B. VELSINK
INVENTOR.
BY
BUCKHORN, BLORE, KLARQUIST & SPARKMAN
ATTORNEYS

United States Patent Office 3,305,800
Patented Feb. 21, 1967

3,305,800
ELECTRICAL TRANSFORMER CIRCUIT
Willem B. Velsink, Beaverton, Oreg., assignor to Tektronix, Inc., Beaverton, Oreg., a corporation of Oregon
Filed Aug. 15, 1963, Ser. No. 302,343
6 Claims. (Cl. 333—32)

The subject matter of the present invention relates generally to electrical signal transformers and in particular to transformer circuits capable of transmitting signals of extremely high frequency and/or fast rise time without distorting the wave form of such signals. The transformer circuit of the present invention employs a transmission line addition connection in order to increase the speed of response of such transformer circuit while producing an output signal of a higher voltage amplitude.

The transformer circuit of the present invention is especially useful as a current transformer circuit to examine the wave form of fast rise time pulses, such as are produced in electronic computers and the like, by using a lead wire in such test circuit as the primary winding input of the transformer circuit and connecting the secondary winding output of such transformer to the vertical input terminal of a cathode ray oscilloscope. Thus, the current transformer circuit of the present invention may form part of a test probe which extracts an input current signal from the circuit under examination by a current transformer technique and adds the voltages induced by such input signal in the turns of the secondary windings of the current transformer in such a manner to produce an output signal voltage. The output signal may be of an extremely fast rise time which may be less than 0.2 nanosecond, or a high frequency greater than 1750 megacycles per second. The transformer circuit of the present invention is also useful in connecting a pair of transmission lines of different characteristic impedances so that an input signal can be transmitted from one transmission line to another without any appreciable distortion of its wave form, and with very little power loss.

The transformer circuit of the present invention has several advantages over previous current transformer circuits. In addition to increasing the speed of response of such transformer circuit, the stray capacitance of the main transformer of such circuit is reduced a considerable amount which greatly improves the transient response of such circuit. This reduction of stray capacitance is the result of the fact that adjacent points on different secondary windings change their voltage simultaneously by substantially the same amount in the same direction so that the voltage between such adjacent points remains substantially the same. The increase in frequency and improved rise time is accomplished by employing a greater number of secondary windings having a fewer number of turns per winding and by connecting such secondary windings together through isolation transformer cores to provide transmission line addition of the voltages induced in the secondary turns in order to produce a single-ended output signal whose rise time is approximately equal to the time delay for one turn multiplied by the number of turns per winding.

It is therefore one object of the present invention to provide an improved transformer circuit which has a faster signal response.

Another object of the invention is to provide an improved transformer circuit with a faster rise time and an increased high frequency response.

A further object of the present invention is to provide an improved current transformer circuit which employs a transmission line addition technique in adding the signals induced in the secondary windings of such circuit to produce an output pulse of higher voltage and faster rise time.

An additional object of the invention is to provide an improved transformer circuit having reduced stray capacitance and a better transient response.

Still another object of the present invention is to provide an improved transformer circuit for connecting transmission lines of different characteristic impedance so that a signal may be transmitted from one line to another with substantially no distortion and very little power loss.

Other objects and advantages of the present invention will be apparent from the following detailed description of certain preferred embodiments thereof of which:

Figure 1:
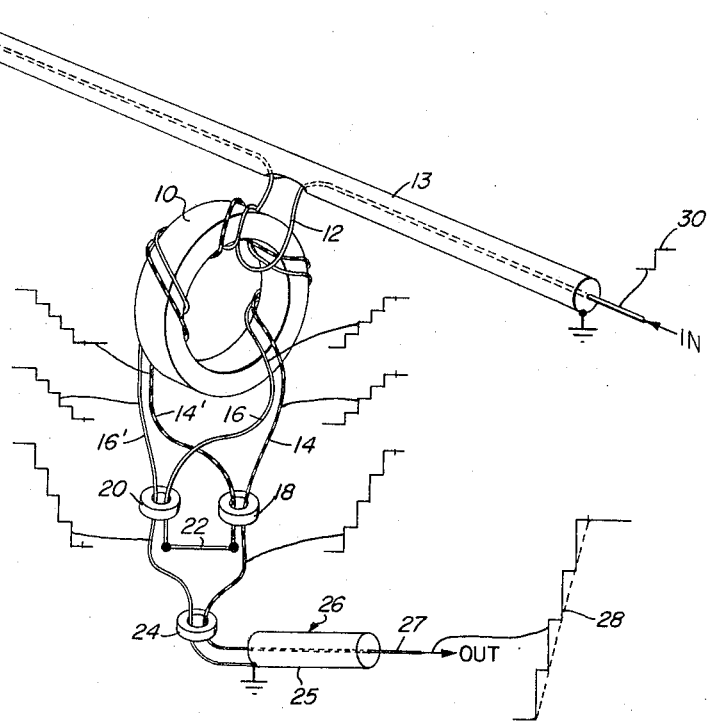
FIG. 1 is a schematic diagram of one embodiment of the transformer circuit of the present invention which may be employed as a current transformer circuit.

As shown in FIG. 1, one embodiment of the transformer circuit of the present invention includes a main transformer core 10 which may be in the form of a circular ring on toroid of suitable magnetic material, such as one of the ferrite compounds. A primary winding 12 extends through the annular main transformer core 10 and thereby forms a single primary turn for such core. The primary winding 12 may be the inner conductor of a coaxial cable having a characteristic impedance of 50 ohms which forms part of a circuit from which a test signal is to be obtained. This inner conductor 12 is brought through an opening in the outer shield conductor 13 of such coaxial cable. A pair of secondary windings 14 and 14' and 16 and 16' are wound with four turns each about the main transformer core 10 in the same direction. The opposite ends 14 and 14' of one of the secondary windings extend through a first isolation transformer core 18 in the same direction, while the opposite ends 16 and 16' of the other secondary winding extend in a similar manner through a second isolation transformer core 20. The two secondary windings are connected in series by means of a short circuit lead wire 22 connected between the end 14' of the first secondary winding and the end 16 of the second secondary winding after such winding ends pass through the isolation cores 18 and 20. Thus, the isolation cores 18 and 20 are positioned between the short circuit connection 22 and the main transformer core 10 to delay any signal reflections from such short circuit connection before they reach such main core. The other ends 14 and 16' of the two secondary windings are passed through a third isolation transformer core 24 in the same direction. These isolation transformer cores 18, 20 and 24 may be made of similar magnetic material to the main transformer core 10 and of substantially the same annular ring shape, but of a smaller diameter than such main core. The output terminal of the end portion 16' of the second secondary winding is then grounded, such as by connecting it to the outer shield conductor 25 of an output coaxial cable 26 in order to provide a single-ended output signal. The output terminal of the end portion 14 of the first secondary winding is connected to the inner signal conductor 27 of such output coaxial cable so that a high voltage output signal 28 is transmitted from such inner conductor when a current pulse input signal 30 is applied to the primary winding 12.

The single step input signal 30 can be thought of as inducing a voltage step of equal magnitude ($Et$) simultaneously in each of the turns of the secondary winding. At high frequencies on the order of 100 megacycles per second, or equivalent rise times of 3.5 nanoseconds, the voltage step induced in each turn of the secondary windings by the input signal 30, is propagated in transmission line fashion in opposite directions to the opposite ends 14 and 14′ and 16 and 16′ of the two secondary windings after a total time delay related to the time delay per turn (T$t$) to produce push-pull signals before reaching the short circuit connection 22. These push-pull signals may be thought of as each having four voltage step portions of E$t$ amplitude and T$t$ width in their leading edge, or an amplitude of 4E$t$ and a rise time of approximately 4T$t$ because of the fact that each of the secondary windings is provided with four secondary turns on the main transformer core. Thus, the voltage steps induced in the secondary turns more remote from the ends of the secondary windings are propagated a greater distance and will reach such winding ends at a later time. For this reason, each of the push-pull signals produced on the ends of the secondary windings before reaching the short circuit connection 22 will have a rise time equal to a stairstep wave form having a number of steps equal to the number of turns per winding. Thus, the rise time of these push-pull signals is equal to $N/2 \times Tt$ where N is the total number of secondary turns and T$t$ is the time delay of one turn. Actually these signals would not be stairstep signals but have smooth leading edges in the form of ramps which are of the same rise time as such stairstep signals, because the secondary windings are continuously wound about the main core and the secondary turns are not separated from each other. However, it is easier to think in terms of stairstep signals.

As the push-pull stairstep signals on the ends 14 and 14′ of the first secondary winding of FIG. 1 are transmitted through the first isolation core 18 past the short circuit connection 22, these signals are added together in transmission line fashion to produce a single-ended positive stairstep signal whose voltage amplitude is equal to the sum of the individual push-pull signals and whose rise time is substantially the same as such individual push-pull signals. In a similar manner the push-pull signals produced on the ends 16 and 16′ of the second secondary winding are added together at short circuit connection 22 to produce a single-ended negative stairstep signal having a voltage amplitude of twice that of the individual push-pull signals on the end portion 16′ of such secondary winding as it passes through the third isolation core. Portions of the push-pull signals are reflected from the short circuit connection 22 back toward the main transformer core 10 along the secondary windings. However, the high impedance provided by the inductance of the isolation core 18 and 20 prevents such signal reflections from reaching the main core until after the output signal 28 has ceased. Thus, the stairstep signals produced on the end portions 14 and 16′ of the first and second secondary windings as such windings pass through the third isolation core 24, each contain four stairsteps with a voltage height equal to 2E$t$ or twice the voltage induced in the individual turns of the secondary winding and a time width equal to T$t$ or the time delay of one such turn. It should be noted that the positive and negative signals on the end portions 14 and 16′, respectively, of the secondary windings passing through the third isolation core 24 are 180 degrees out of phase so that they appear as push-pull signals at the input of the coaxial cable 26. These push-pull signals are added by the transmission line addition at such cable to produce a single-ended stairstep output signal 28 whose amplitude is equal to twice the amplitude of one of such push-pull signals and four times the amplitude of the push-pull signals transmitted through isolation cores 18 and 20. As a result, the output signal 28 has four voltage steps each having a height equal to four times the voltage E$t$ induced in one turn of the secondary windings and a width equal to the time delay T$t$ of such one turn.

The isolation cores 18 and 20 delay the signal reflections from the short circuit connection 22 back to the main transformer core 10 until after the push-pull signals have been added to produce the output signal, as discussed above. In this manner, the main transformer core is tricked into seeing a push-pull output connection, rather than a short circuit, for a total time delay (T$d$) equal to twice the propagation time (T$p$) of the signal over the transmission line formed by the secondary windings plus twice the time delay ($L/Z_o$) introduced by the isolation core, or $Td = 2Tp + 2L/Z_o$, where L is the inductance added to the secondary winding by such isolation core and $Z_o$ is the characteristic impedance of the transmission line. In a similar manner the third isolation core 24 prevents the main transformer core 10 from seeing the grounded output terminal of the end portion 16′ of the second secondary winding to delay the signal reflections from such grounded connection to such main core until after a sufficient time delay that the output signal 28 has ceased so that a push-pull signal is transmitted to the output cable 26.

Conventional current transformer circuits employing a single secondary winding produce a stairstep output signal having a rise time of about $N \times Tt$ where N is the total number of secondary turns and T$t$ is the time delay per turn, while the rise time of the circuit of FIG. 1 is approximately $N/2 \times Tt$. Thus, the transformer circuit of the present invention produces an output pulse with a faster rise time than that of previous transformer circuits. This rise time can be improved even more by employing more secondary windings of fewer turns. Thus, any number of total secondary turns (N) and secondary windings (W) can be employed as long as the ratio of turns per winding is greater than or equal to 1 and is a real number, or $N/W \geq 1$. When a plurality of single turn secondary windings are employed, the rise time of the output signals is equal to $1 \times Tt$ or the total propagation time of the signal along the secondary winding about the core, whichever is greater.

In addition to providing a faster rise time or higher frequency response, the transformer circuit of the present invention also reduces the stray capacitance between the turns of the secondary windings to improve the transient response of such circuit. This reduction of stray capacitance is due to the fact that the voltages on all of the secondary turns change simultaneously by the same amount and in the same direction when an input signal pulse is applied to the primary winding so that the voltage difference between adjacent turns remains about the same, or very nearly zero. Since the stray capacitance between turns is proportional to the voltage between turns, such capacitance is reduced considerably. Thus, the resonate frequency of the distributed L–C circuit formed by such stray capacitance and the inductance of such winding, is increased and the transient response improved.

Figure 2:
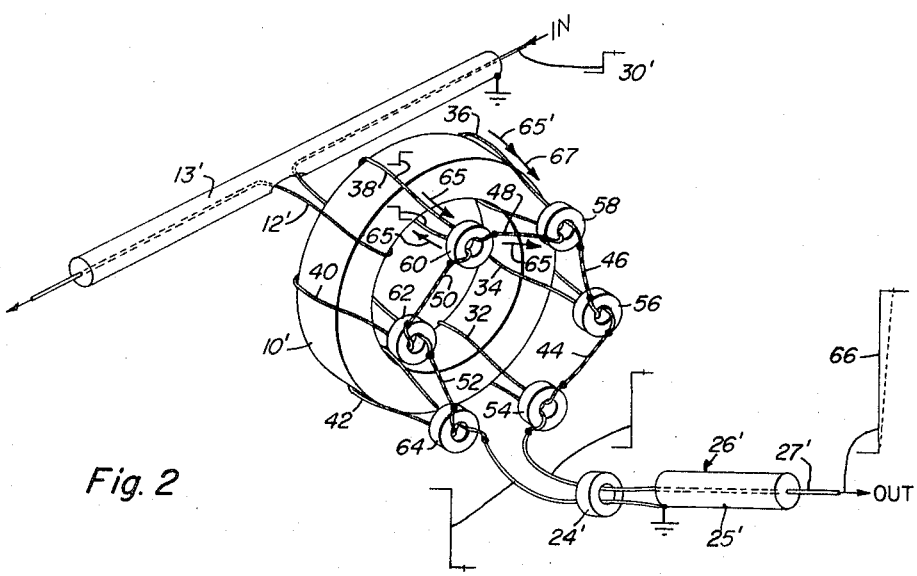
FIG. 2 is a schematic diagram of another embodiment of a transformer circuit similar to that shown in FIG. 1.

As shown in FIG. 2 the two multi-turn secondary windings of the transformer circuit of FIG. 1 may be replaced by six single turn secondary windings 32, 34, 36, 38, 40 and 42 which are wound in the same direction about a main transformer core 10′, and are connected in series by short circuit connections 44, 46, 48, 50 and 52. The opposite ends of each of the secondary windings 32, 34, 36, 38, 40 and 42 extend in the same direction through isolation cores 54, 56, 58, 60, 62 and 64, respectively, so that such isolation cores are positioned between the main transformer core 10′ and the short circuit connections in order to delay the signal reflections from such short circuit connection to such main transformer core. The single step input signal 30′ applied to the primary winding 12′ of the main transformer core produces a single step output signal 66 on the inner conductor 27′ of the coaxial cable 26′ which has a voltage amplitude equal to twelve times the voltage (E$t$) induced in the single turn of the secondary windings and has a rise time approximately equal to the time delay (T$t$) of such one turn.

This may be explained by considering the effect of one of the secondary windings 38 on its adjacent windings 36. When a voltage step is induced in the secondary winding 38 by the current pulse 30', current flows through the isolation core 60 in the direction of arrows 65 away from the transformer core 10', passes through the isolation core 60 and flows through the short circuit connection 48 immediately to the secondary winding 36. The short circuit connections should be of equal length and as short as possible to prevent any appreciable delay in transmission of the current from one winding to the isolation core of an adjacent winding. This current then flows through the isolation core 58 and immediately induces an additional current indicated by arrow 67 in the opposite side of the secondary winding 36 which flows in the opposite direction through the isolation core toward the short circuit connection 46 to prevent any change in the magnetic flux of such core. As a result, this induced current is added substantially instantaneously to the current 65' produced in the secondary winding 36 by the current flow in the primary winding 12' so that the sum of these two currents flows through the short circuit connection 46 to the secondary winding 34. These two currents also flow through the isolation core 56 and induce an additional current in the other side of such secondary winding 34 equal to the sum of the current produced by secondary windings 36 and 38. Thus the currents induced in the secondary windings are added to produce a total current in the leads passing through the output isolation core 24' equal to six times the current of one winding. The push-pull voltage signals corresponding to such total current transmitted to such output isolation core each have an amplitude of $6 \times Et$ and produce the single-ended output signal 66 having an amplitude of $12 \times Et$ on the inner conductor 27' of cable 26'.

It should be noted that for a longer time delay it is possible to employ a plurality of turns about the isolation transformer core in order to increase the effective inductance of such core so that the signals reflected from the short circuit connection do not reach the main transformer core 10' until after the output signal has ceased. This may be necessary with pulses of greater width but does not appreciably effect the rise time of such output pulses or the transient response of the transformer circuit.

Figure 3:
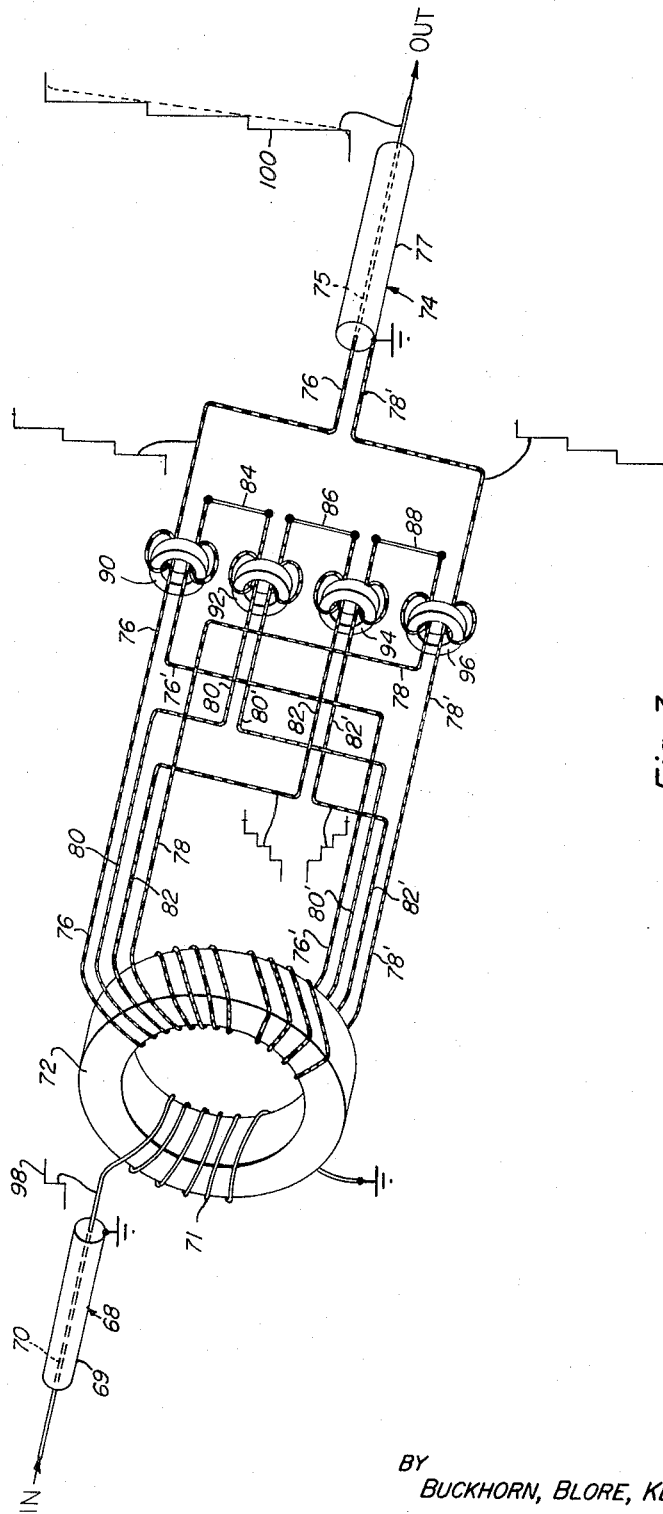
FIG. 3 is a schematic diagram of a third embodiment of the transformer circuit of the present invention which may be employed to connect transmission lines of different characteristic impedance.

As shown in FIG. 3, the transformer circuit of the present invention may also be used to connect together two transmission lines of different characteristic impedance without causing distortion of a signal transmitted from one line to another. An input transmission line 68 in the form of a coaxial cable of 25 ohms characteristic impedance having a grounded outer shield conductor 69 and a signal carrying inner conductor 70 has the output end of such inner conductor connected to one end of a primary winding 71 on a main transformer core 72. This primary winding is wound with six turns about the annular ring-shaped core and is connected to ground at its other end terminal. An output coaxial cable transmission line 74 having a characteristic impedance of 100 ohms is connected by its inner signal conductor 75 to one end of a first secondary winding 76 and 76' while the grounded outer shield conductor 77 of such transmission line is connected to the opposite end terminal of a second-ary second winding 78 and 78'. The first and second secondary windings are connected in series with a third and fourth secondary winding 80 and 80' and 82 and 82', respectively, by short circuit connections 84, 86 and 88. These four secondary windings are wound in the same direction about the main transformer core 72 with three turns per winding to provide a total of twelve secondary turns.

The opposite ends 76 and 76' of the first secondary winding are passed in the same direction through a first isolation core 90 to provide two pair of isolation turns on such core. In a similar manner the second, third and fourth secondary windings have their opposite ends extending through second, third and fourth isolation cores 92, 94 and 96, respectively, in the same direction so that such isolation cores are positioned between the short circuit connections 84, 86 and 88 and the main transformer core 72. These isolation cores function to delay any signal reflections from such short circuit connections to the main core in a similar manner to the isolation cores of FIGS. 1 and 2. It should be noted that a fifth isolation core (not shown) could be provided about the end portions 76 and 78' of the first and second secondary windings before they are connected to the inner conductor and shield conductor of the output coaxial cable 74 in order to provide additional time delay for the signal reflected from the grounded output terminal of winding 78'. However, this fifth isolation core is not essential and has been eliminated because the remaining four isolation cores 90, 92, 94 and 96 provide sufficient time delay without it because the secondary windings are provided with a plurality of turns about such isolation cores. Thus, it can be seen that the four secondary windings are connected in series by the short circuit connections 84, 86 and 88 which are connected respectively between ends 76' and 80' of the first and third windings, between the ends 80' and 82' of the third and fourth windings, and between the ends 78 and 82' of the second and fourth windings.

The impedance of the input transmission line 68 divided by the impedance of the output transmission line 74 is equal to the ratio of 25 ohms to 100 ohms or $\frac{1}{4}$ which is equal to the square of the ratio of the primary turns to the secondary turns, or $(6/12)^2 = \frac{1}{4}$. This means that the impedances of the two transmission lines are matched by the transformer circuit of the present invention for a period determined by the delay time of the isolation cores and the propagation time of the transmission lines formed by the secondary windings. In addition, a single stairstep input signal 98 applied to the primary winding 70 of the input transmission line 68 produces an output signal 100 on the inner conductor 75 of the output transmission line 74 which may be thought of as having a stairstep wave form containing three stairsteps corresponding to the number of turns per secondary winding. Thus, the rise time of the output signal is approximately equal to three times the time delay of one secondary turn and the amplitude of such output signal is equal to twenty-four times the voltage induced in one secondary turn by the input signal 98. Of course, the rise time of the stairstep output signal 100 can be reduced by increasing the number of secondary windings and reducing the number of turns per winding in accordance with the circuit of FIG. 2.

A current transformer circuit similar to that of FIG. 1, but employing three secondary windings of three turns per winding about a main transformer core of ferrite material sold under the name "Ferrox Cube #101" having a diameter of ½ inch and a rectangular cross section of 11×.25 inch, has been tested. An additional isolating core was used to isolate the third secondary winding. This circuit was found to have a rise time faster than 0.2 nanosecond which was the limit of resolution of the pulse generator and sampling oscilloscope system used to measure such rise time. This is equivalent to a frequency response above 1,750 megacycles per second.

It will be obvious to those having ordinary skill in the art that various changes may be made in the details of the above described preferred embodiments of the present invention without departing from the spirit of the invention. For example, since all of the secondary windings are connected in series by the short circuit connections, they would be formed by a single wire wound in a proper manner about the main transformer core. Therefore, the scope of the present invention should only be determined by the following claims.

I claim:
1. An electrical transformer circuit, comprising: a main transformer core of magnetic material;

a primary winding providing at least one primary turn for said main core;

a plurality of secondary windings wound in the same direction about said main core and providing at least one secondary turn with first and second ends for each secondary winding, said secondary windings being connected together in series by at least one short circuit connection between first end of one secondary winding and the second end of another secondary winding and having the second end of said one secondary winding and the first end of the other secondary winding connected as output leads to a pair of output terminals; and a plurality of isolation cores of magnetic material positioned with a different one of said isolation cores associated with the opposite ends of each of said secondary windings between said short circuit connections and said main core, to delay signal reflections from the short circuit connections back to the main core and to add the induced voltages produced at the opposite ends of said secondary windings by an input signal applied to said primary winding in order to generate an output voltage at said output terminals which is the sum of said induced voltages.

2. An electrical transformer circuit, comprising:
a main transformer core of magnetic material;
a primary winding providing at least one primary turn for said main core;
a plurality of secondary windings wound in the same direction about said main core and providing at least one secondary turn for each secondary winding, said secondary windings being connected together by short circuit connections between the end of one secondary winding and the opposite end another secondary winding to form a series circuit; and
a plurality of isolation transformer cores of magnetic material positioned with one of said isolation cores about the opposite ends of each one of said secondary windings between said short circuit connections and said main core to delay signal reflections from the short circuit connections back to the main core.

3. An electrical current transformer circuit, comprising:
an annular main transformer core of magnetic material;
a primary winding extending through the main core to provide at least one primary turn for said main core;
a plurality of secondary windings extending through the main core and wound in the same direction about said main core to provide at least one secondary turn for each secondary winding, said secondary windings being connected together by short circuit connections between the end of one secondary winding and the opposite end another secondary winding to form a series circuit;
a plurality of annular isolation transformer cores of magnetic material positioned with one of said isolation cores about the opposite ends of each one of said secondary windings between said short circuit connections and said main core with the opposite ends of said secondary windings extending through said isolation cores in the same direction to delay signal reflections from the short circuit connections back to the main core; and
an output isolation core of magnetic material positioned about the two output leads at the opposite ends of said series circuit of said secondary windings, between said main core and the grounded output terminal of one of said leads.

4. An electrical transformer circuit, comprising:
an annular main transformer core of magnetic material;
a primary winding extending through the main core to provide at least one primary turn for said main core;
a plurality of secondary windings extending through the main core and wound in the same direction about said main core to provide an equal number of secondary turns for each secondary winding, said secondary windings being connected together by short circuit connections between the end of one secondary winding and the opposite end another secondary winding to form a series circuit; and
a plurality of annular isolation transformer cores of magnetic material positioned with different ones of said isolation cores about the opposite ends of different ones of said secondary windings between said short circuit connections and said main core with the opposite ends of said secondary windings extending through said isolation cores and wound about said isolation cores for a plurality of turns in the same direction to delay signal reflection from the short circuit connections back to the transformer core.

5. An electrical transformer circuit, comprising:
a main transformer core of magnetic material;
a primary winding providing one primary turn for said main core;
a plurality of secondary windings wound in the same direction about said main core and providing one secondary turn for each secondary winding, said secondary windings being connected together by short circuit connections between the end of one secondary winding and the opposite end another secondary winding to form a series circuit; and
a plurality of annular isolation transformer cores of magnetic material positioned with one of said isolation cores about the opposite ends of each one of said secondary windings between said short circuit connections and said main core with the opposite ends of said secondary windings extending through said isolation cores in the same direction to delay signal reflections from the short circuit connections back to the main core.

6. An electrical transformer circuit, comprising:
a main transformer core of magnetic material;
a primary winding providing a plurality of primary turns for said main core;
a plurality of secondary windings wound in the same direction about said main core and providing at least one secondary turn for each secondary winding, said secondary windings being connected together by short circuit connections between the end of one secondary winding and the opposite end another secondary winding to form a series circuit; and
a plurality of annular isolation transformer cores of magnetic material positioned with one of said isolation cores about the opposite ends of each one of said secondary windings between said short circuit connections and said main core with the opposite ends of said secondary windings extending through said isolation cores in the same direction to delay signal reflections from the short circuit connections back to the main core.

References Cited by the Examiner

UNITED STATES PATENTS

| | | | |
|---|---|---|---|
| 2,596,149 | 5/1952 | Hilfarty | 328—186 |
| 3,013,259 | 12/1961 | Bleam | 340—354 |
| 3,036,293 | 5/1962 | Vester | 333—29 |
| 3,037,185 | 5/1962 | Dewitz | 340—3 |
| 3,051,918 | 8/1962 | Germesbausen | 333—31 |

HERMAN KARL SAALBACH, *Primary Examiner.*

C. BARAFF, *Assistant Examiner.*